UNITED STATES PATENT OFFICE.

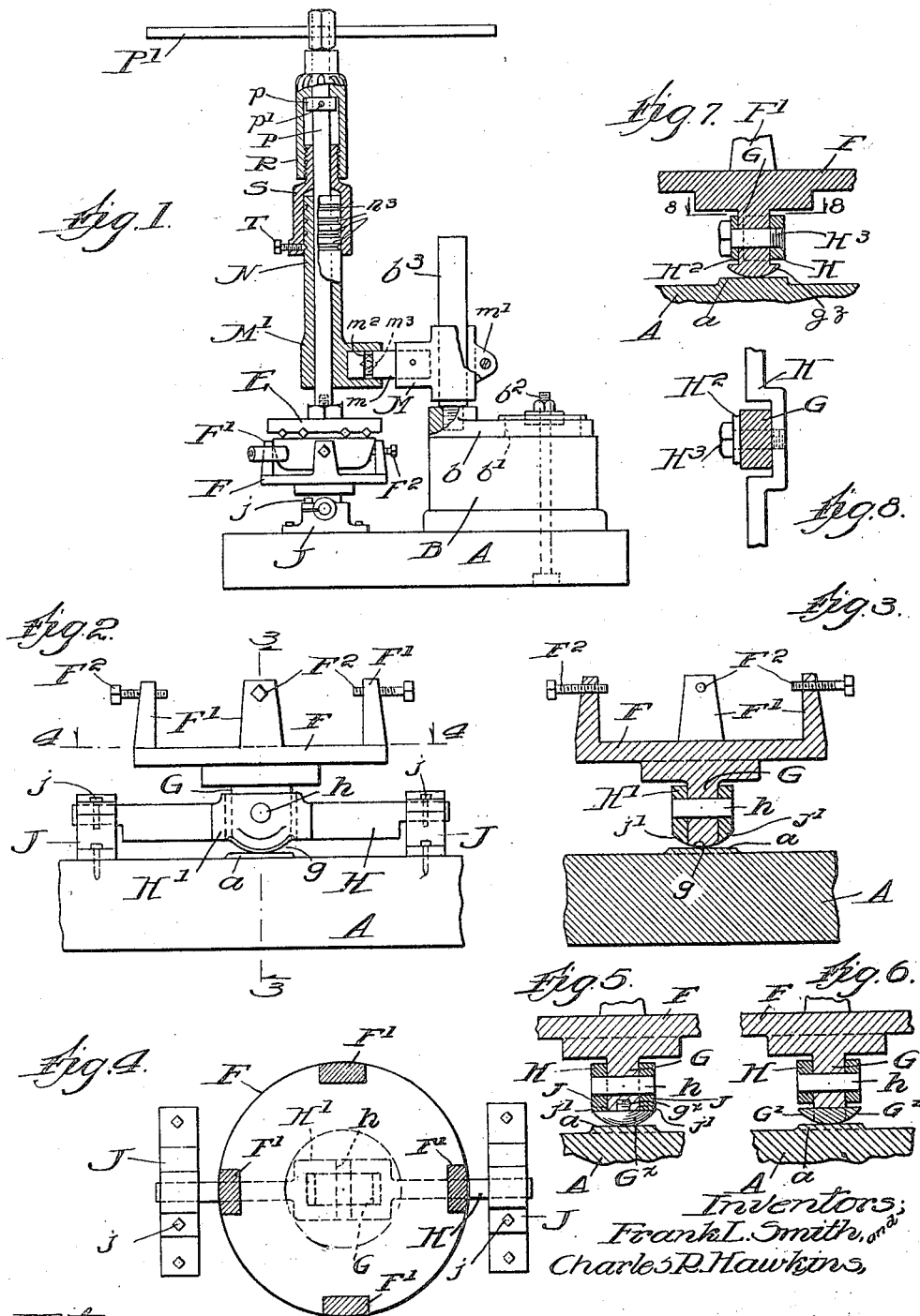

FRANK L. SMITH AND CHARLES R. HAWKINS, OF CHICAGO, ILLINOIS.

MACHINE FOR DRESSING FITTED BEARINGS AND THE LIKE.

1,384,163.     Specification of Letters Patent.     Patented July 12, 1921.

Application filed November 13, 1919. Serial No. 337,849.

*To all whom it may concern:*

Be it known that we, FRANK L. SMITH and CHARLES R. HAWKINS, citizens of the United States, and residents of the city of Chicago, in the county of Cook and the State of Illinois, have invented certain new and useful Improvements in Machines for Dressing Fitted Bearings and the like, of which the following is a specification, reference being had to the accompanying drawings, forming a part thereof.

The purpose of this invention is to provide an improved machine, particularly designed for hand operation (though capable of being power-operated) for the purpose of dressing valve seats and the like in machine parts and pipe fittings. It consists of the elements and features of construction shown and described as indicated in the claims.

In the drawings:

Figure 1 is a partly sectional side elevation of a machine embodying this invention, the section being in a vertical plane axial with respect to the tool holder extending through the tool-supporting member.

Fig. 2 is an enlarged view in front elevation of the work holder.

Fig. 3 is a section at the line, 3—3, on Fig. 2.

Fig. 4 is a section at the line, 4—4, on Fig. 2.

Fig. 5 is a view similar to Fig. 3, showing a modification.

Fig. 6 is a similar view, showing a different modification.

Fig. 7 is a detail section similar to Fig. 3, showing another modification.

Fig. 8 is a section at line 8—8 on Fig. 7.

The machine shown in the drawings comprises a tool holder and a work holder mounted upon a common base, A. The tool holder comprises a two-part base standard, B, $b$, said two parts, B, $b$, being connected for sliding the upper part, $b$, on the lower part or main base, B, and for securing the two parts together at any adjustment within the range of movement of the former upon the latter permitted by the slot, $b^1$, in the part, $b$, through which the bolt, $b^2$, extends for clamping the two parts, B and $b$, together at adjusted position; and this bolt may be the same which secures the entire base comprising the parts, B and $b$ to the work or to the bed, A, which supports the work, (and in the drawings supports the work-holder.) The part, $b$, constitutes a standard and has a stud, $b^3$, projecting at its upper end for swiveling and adjusting vertically thereon the first T-shaped member, M, of the two-part tool carrying member which comprises also a second T-shaped part, $M^1$, which is pivotally mounted on the part, M, for swinging in a vertical plane about the axis of the horizontally-projecting stud, $m$, with which said part, M, is provided, projecting from the stem of the T. The second part, $M^1$, of the tool-carrying member is also as stated, T-shaped, the stem of the T being socketed for mounting it on the stud, $m$; and said stud has a circumferential groove, $m^2$, with which a set screw, $m^3$, engages for retaining the parts together in their swiveling action; and in which groove the set screw is set tight for securing the parts, M and $M^1$, in angular adjustment at their said swiveling or pivotal connection.

Through the cross of the T-shaped part, $M^1$, is extended as the tool shaft journal bearing, N, through which the shaft or stem, P, of the tool or cutter head, E, extends. The cross of the T, M, is split at the side opposite the stem, and provided with lugs, $m^1$, through which a clamping bolt takes for clamping the split member on to the stud, $b^3$. R is a tool feeding sleeve which is positioned on the shaft, P, above the bearing, N. The shaft protrudes through this sleeve at the upper end and has pinned fast to it at its protruding end an operating handle, $P^1$, for rotating said shaft. The shaft is engaged with the feeding sleeve, R, for relative rotation and against relative longitudinal movement, by a collar, $p$, pinned fast to the shaft (see the pin, $p^1$) under the head of the sleeve. S is a second feed sleeve which at its upper end is journaled on the shaft, P, between the upper end of the journal bearing, N, and the lower end of the bearing portion of the sleeve, R; and said sleeve, R, at its lower end is counterbored and interiorly threaded for screwing on to the upper end portion of the sleeve, S, which at its upper end is reduced in diameter and exteriorly threaded for such engagement. At its lower end portion the sleeve, S, is counterbored to the outer diameter of the journal bearing, N, and is thereby journaled on said bearing, N, outside the same. At the portion inclosed or encompassed by said sleeve, S, the journal bearing, N, is provided with a series of circumferential grooves, $n^3$, at short distances apart, with which a set screw, T, which is screwed through the sleeve, S, engages to position the said sleeve, S, on the bearing, N, at any one of the plurality of positions at which said set screw may engage one of said grooves. This expedient provides a step-by-step adjustment of the tool shaft, and thereby of the tool, vertically in the bearing, N; and the sleeve, R, which is exteriorly fluted for hand engagement, by means of its threaded engagement with the sleeve, S, and its engagement by means of the key, $p$, with the shaft, P, affords means for feeding adjustment of the tool shaft vertically throughout a range greater than the interval between the steps of the step-by-step adjustment provided by the grooves, $n^3$. It will be understood that the step-by-step adjustment mentioned is designed to make a quick adjustment of the tool to approximately its desired position of work, while the threaded engagement between the two sleeves affords means for the progressive advance which may be required of the tool in respect to its work.

E is the cutter head carried at the operating end of the tool stem, P. F is a work-holder of the nature of a chuck device and consisting of a cup-shaped member having the wall of the cup interrupted at intervals and the intervening portions, $F^1$, left standing provided with radially-positioned screws, $F^2$, for engaging and centering the work. For the purpose of adapting the work holder to tilt in order to accommodate the face of the work which is to be dressed to the plane of rotation of the tool, the work holder is provided with a stem, G, projecting at the side of the work holder opposite that at which the tool is positioned, such stem being connected at a pivot, $h$, to a rock shaft, H, which is journaled in bearings, J, J, mounted on the base, A, the axis of the pivot of said stem to said rock shaft intersecting the axis of the rock shaft, so that there is afforded a universal joint connection of the work holder to the fixed base, A. This universal joint being obtained by involving the rock shaft, H, which is of length between its bearings sufficient to span the entire diameter of the work holder and therefore liable to spring under the pressure of the work, it is desirable to provide a support directly in the line of that pressure,—that is, the line of the axis of the tool; and for this purpose the stem, G, of the work holder is extended below the rock shaft and is provided with a spheroidal termination, that is, curved spherically, as seen at $g$, about the intersection of the axis of the pivot with the axis of the rock shaft; and on the base, A, there is provided a step or thrust bearing, $a$, sufficiently upraised to afford lodgment for the spheroidal end of the stem at normal,—that is, unsprung, position of the rock shaft. This construction not only prevents the load from springing the rock shaft, but also relieves the pivot pin, $h$, from the shearing stress to which it would be subjected if there were not provided the direct support for the stem, G, at its lower end. A convenient means of constructing the parts so as to afford the stem with the spheroidal terminal described, is that shown in the drawing in which said stem is flat,—that is, oblong in cross-section, with the pivot, $h$, extending through the shorter dimension of that cross section, said flat or oblong stem being inserted through a corresponding longitudinal slot in the rock shaft, which is enlarged at the middle part of its length to afford room for such slot, the enlargement or boss, $H^1$, comprising a portion projecting below, as well as a portion projecting at the opposite sides of the rock shaft. The stem extends entirely through this boss; and its lower end, with the wings, $j^1$, $j^1$, of the boss projecting at that side of the shaft, are finished spheroidally together, as may be understood from Fig. 3, so that in case of any tilting of the work holder through an angle greater than would be measured by the thickness of the flat stem, the spheroidally-formed lower end of the boss will contact with the stem for such bearing, $a$, and afford the necessary support.

It will be understood that the form of the work-holder or chuck member, F, having its cylindrical wall interrupted and reduced to fingers, $F^1$, as shown, is to accommodate work of irregular form, and particularly such as pipe fittings having projecting bosses or arms which would prevent the mounting of the work within a chuck or holder having its surrounding wall or flange uninterrupted.

In a modification shown in Fig. 5, the spheroidal foot of the work holder stem is afforded by a detachable terminal or button, $G^x$, which is a spherical segment having a threaded stem, $g^x$, for screwing into the end of the flat stem, G, which in that case terminates with a square-cut end and has a centrally-positioned tapped hole to receive the stem, $g^x$, of the button after the stem, G, has been inserted through the shaft, H, and secured by the pivot pin, $h$. In this construction the two wings, $j^1$, $j^1$, of the boss, $J^1$, are finished in cylindrical curves about the axis of the pivot pin, $h$, with a radius reaching to the flat upper face of the button $G^x$, so that the latter is seated on the ends of the wings throughout the range of tilting of the stem, G, about the pivot, $h$.

A second modification is shown in Fig. 6, consisting in providing a cross foot piece, $G^z$, interlocked with the lower end of the flat stem, G, and finished spheroidally about the intersection of the axis of the pivot, $h$, with the axis of the shaft, H.

The advantage of either of the forms shown in Fig. 5 or Fig. 6, over that shown in Fig. 3, is that in case of tilting of the work holder in a direction to rock the shaft, H, and through an angle from vertical great enough to carry the bottom end of either side of the flat stem, G, laterally beyond the line of down-thrust or pressure, that down-thrust is still transmitted directly through the stem, G, to the step, $a$, without imposing shearing stress on the pivot pin, $h$, as would be the case under like circumstances with the form shown in Fig. 3.

It is considered advisable, and is quite important in some classes of work, to be able to secure the work holder in the position to which it may be automatically brought by the thrust of the tool against the work, rocking it over the transversely-extending pivotal supports described; so that, having been thus properly positioned with respect to the tool by the impact of the latter against the face to be dressed, it may not be displaced from this proper position by any one-sided resistance encountered by the tool in its work, which would tend to defeat the true and accurate dressing of the surface to be operated upon. For this purpose the bearings in the parts, J, for the ends of the rock shaft, H, are split as seen in Fig. 1, and provided with clamp screws, $j, j$, which being tightened, serve to hold the rock shaft securely against turning in said bearing. And for like purpose the aperture referred to as a longitudinal slot in the rock shaft, H, through which the flat or oblong stem is extended, is made by transversely channeling the boss or enlargement, $H^1$, and applying at the open side of the channel a clamping plate or washer, $H^2$, the pivot pin, $H^3$, being a bolt which is set through the boss and through the stem, G, and through the clamping plate, and which may be tightened to clamp the stem firmly into the slot by means of its nut, $h^3$. And constructed in this manner, the cross foot piece which is shown in Fig. 6, designated $G^z$, may be formed integrally with the stem as seen at $g^z$, in Fig. 7.

It will be understood that the structure described is designed to be employed not only with the tool holder and work holder mounted upon a base, A, as shown in the drawings, but with said tool holder mounted directly upon the work; i. e., the piece of machinery having the surfaces which are to be dressed. That is to say, the base, A, shown in the drawings may be taken as representing conventionally any piece of work or machinery having surfaces which require dressing, and upon which for that purpose the base, B, $b$, may be lodged and secured by a bolt as $b^2$, for which engagement may be found in the substance of the machine or machine part which is to be operated upon.

We claim:

1. In a machine for the purpose indicated, a tool-carrying member comprising a base standard of which the two parts are relatively adjustable longitudinally, and a clamping bolt for securing them in their relative adjustment; said bolt extending vertically through both members and serving to secure the base standard bodily to the work or its support.

2. In combination with the structure defined in claim 1 foregoing, a member having means for carrying the tools mounted for vertical adjustment on the upper of said two parts of the base, and means for securing it at vertically adjusted position.

3. In combination with the structure defined in claim 1 foregoing, a member mounted on the upper of said two parts of the base for adjustment with respect thereto about a vertical axis, and means for securing it in adjustment about said axis.

4. In a machine for the purpose indicated, in combination with a base adapted to be secured by a bolt to a seat fixed with respect to the work, and to be angularly adjustable on said seat about the bolt, a tool-carrying member mounted on the base for adjustment toward and from the seated face of the base, and angularly adjustable for carrying the tool bodily in a plane parallel to said angular adjustment of the base.

5. In a structure defined in claim 4 foregoing, the tool-carrying member comprising two parts which are connected for relative adjustment about an axis parallel to and offset from that of said angular adjustment of said tool-carrying member relatively to the base.

6. In a structure defined in claim 4 foregoing, the tool-carrying member comprising two parts which are connected for angular adjustment about an axis transverse to that of the angular adjustment of the tool-carrying member as a whole relatively to the base.

7. A machine for the purpose indicated, comprising a base adapted to be mounted removably on the work; a tool-carrying member mounted on the base for angular adjustment about a vertical axis, and comprising two parts which are connected for angular adjustment about a horizontal axis, and means for securing said parts in angularly adjusted relation.

8. In a structure defined in claim 7, the base comprising two parts which are relatively adjustable longitudinally, and means for securing them in such adjustment.

9. In a machine for the purpose indicated, a supporting structure comprising journal bearing for the tool shaft; a feed sleeve on the shaft engaged therewith for relative rotation, and against relative longitudinal movement of the shaft and said feed sleeve; and a sleeve on the journal bearing having screw-threaded engagement with the feed sleeve and having means for step-by-step engagement with the journal bearing.

10. In a machine for the purpose indicated, in combination with a tool holder mounted for rotation, a work holder mounted for rocking about two axes transverse to each other and transverse to the axis of rotation and thrust of the tool, and means for securing the work holder at the position to which it may be rocked over its said transverse bearing by the thrust of the tool.

11. In the construction defined in claim 10 foregoing, the means for securing the work holder as stated, consisting of means for clamping the bearing in which said work holder rocks about said two transversely situated axes.

12. In a machine for the purpose indicated, in combination with a tool holder mounted for rotation, a work holder having a stem projecting in the general direction of the tool holder axis, at the opposite side of the work holder from the tool holder, a rock shaft journaled at right angles to the tool holder axis with its axis intersecting the tool holder axis produced, said stem being pivoted to the rock shaft at an axis intersecting the axis of said shaft, and a fixed step below the rock shaft, the stem being extended to said step and having its end spheroidal about the intersection of the stem pivot axis and the rock shaft axis.

13. In the structure defined in claim 1, the stem being flat or oblong in cross section, and having its pivot axis through the shorter dimension of said cross-section, the spheroidal terminal of said stem being afforded by a cross-piece interlocked with the end of the stem transversely of the longer dimension of its cross-section, the end of both the stem and the interlocked cross piece being shaped spheroidally as called for in claim 1.

In testimony whereof, we have hereunto set our hands at Chicago, Illinois, this 11th day of October, 1919.

FRANK L. SMITH.
CHARLES R. HAWKINS.